TELEVISION SIGNAL CONVERTER CIRCUIT

Filed May 14, 1965

INVENTOR.
DAVID J. CARLSON

BY Eugene M. Whitacre

Attorney

United States Patent Office 3,416,086
Patented Dec. 10, 1968

3,416,086

TELEVISION SIGNAL CONVERTER CIRCUIT

David John Carlson, Indianapolis, Ind., assignor to Radio Corporation of America, a corporation of Delaware Filed May 14, 1965, Ser. No. 455,684
13 Claims. (Cl. 325—436)

ABSTRACT OF THE DISCLOSURE

A television signal converter includes a trap circuit connected in series therewith so as to decrease the gain of the converter at undesirable beat frequencies generated during the conversion action.

This invention relates to mixer or converter circuits in general and more particularly, to mixer circuits for television receivers.

In intercarrier type of receivers, such as television receivers operable over a broadcast band of frequencies known and used in the United States as channels 2–13, a received television signal is heterodyned with a local oscillator wave to produce corresponding intermediate frequency signals including the sound and picture carriers. It has been noticed that distortion of the reproduced picture signal often occurs when the receiver is tuned to channel six. Such distortion has been traced to undesired signals resulting from harmonics and various combinations of the sound and picture carriers of the channel six signal heterodyning with the local oscillator wave.

A mixer circuit in accordance with one embodiment of the invention includes a tuned resonant circuit or trap, tuned to the frequency of those undesired signals which produce the channel six distortion, connected in series with the mixer amplifying device. The undesired signals which were experimentally found to be most responsible for the distortion are: (1) the second harmonic of channel six sound carrier (175.5 mc.); and (2) the sum of the channel six picture carrier and the channel six sound carrier (171 mc.). These undesired signals heterodyne with the local oscillator wave, which for channel six is 129 mc., to produce beats at 46.5 mc. and 42.0 mc. The frequency response of the resonant circuit trap in such case is selected to be broad enough to trap both the 175.5 mc. and the 171 mc. signals. Alternatively separate high Q traps may be provided for each of the mentioned undesired signals.

In accordance with a feature of the invention, switching means is provided for shorting the trap circuit when the television receiver is tuned to channels other than channel six.

Figure 1:
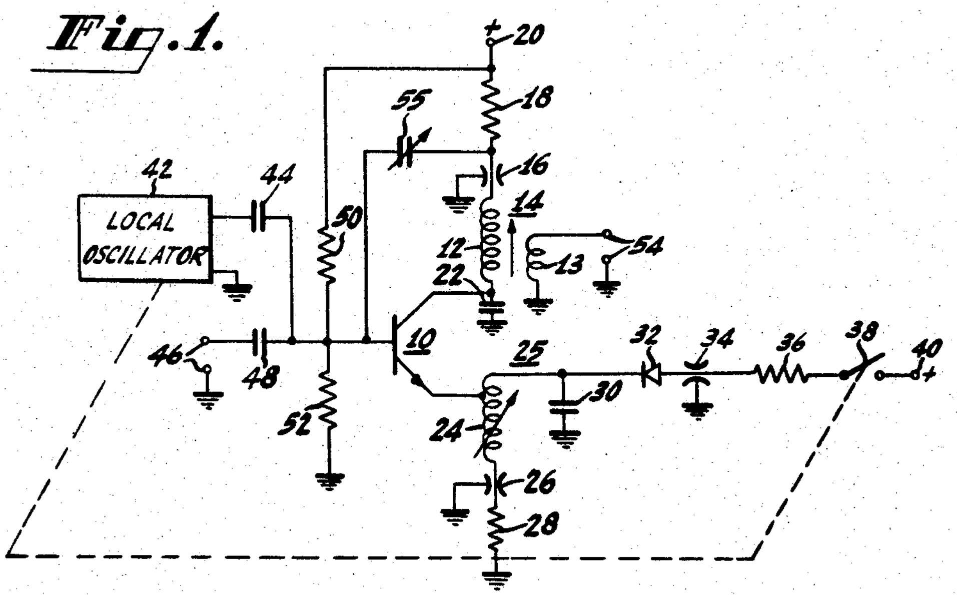
Figure 2:
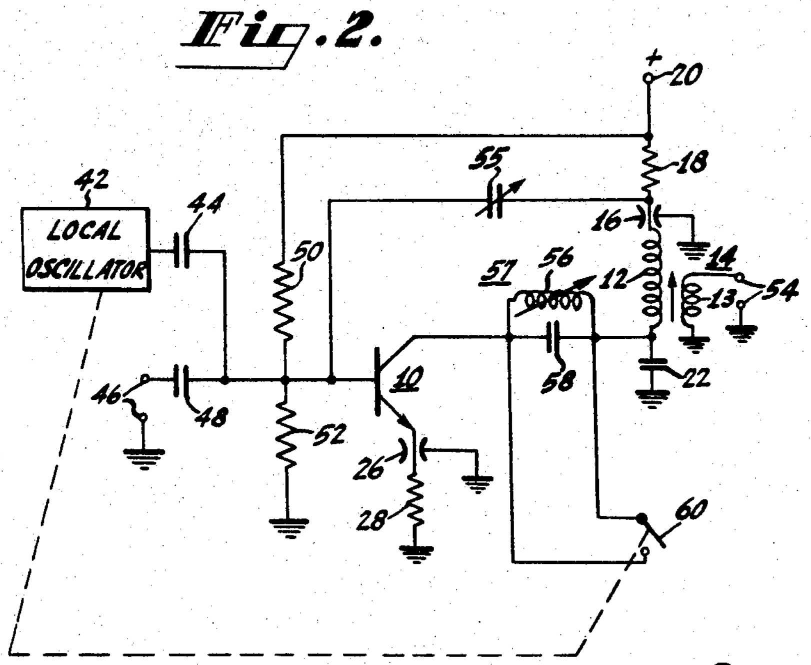

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawings in which:

FIGURE 1 is a schematic circuit diagram of a mixer circuit embodying the invention; and FIGURE 2 is a modification of the mixer circuit of FIGURE 1.

Undesirable heterodyne components are generated by the mixer stage (first detector), of a television receiver tuned to a channel six (82–88 megacycles) which appear at the receiver intermediate frequency (I.F.) (41–47 megacycles). These undesired or spurious components were found to result from heterodyning the channel six oscillator wave with harmonics of, and combinations of, the channel six sound and picture carriers. It has been determined experimentally that perhaps the most offensive of the undesired heterodyne components result from the beating of the 129 mc. channel six oscillator wave with (1) the second harmonic of the channel six sound carrier (175.5 megacycles), and (2) the sum of the channel six picture carrier and the channel six sound carrier (171 megacycles).

These signal components combine with the local oscillator frequency to produce undesirable heterodyne components within the intermediate frequency bandpass of the receiver in the following manner:

(1) *46.5 mc. beat*

2nd harmonic of ch. 6 snd. carrier—local oscillator
ch. 6=2 (87.75 mc.)=175.5−129 mc.=46.5 mc.

(2) *42.0 mc. beat*

(ch. 6 pix carrier+ch. 6 snd. carrier)−loc. osc.
ch. 6=(83.25 mc.+87.75 mc.)=171−129 mc.=42.0 mc.

The resultant 46.5 megacycle and the 42 megacycle heterodyne components fall within the intermediate frequency bandpass (41–47 mc.) of television receivers. It will be noted that such components will fall into the I.F. passband of the receiver whenever the signal frequency is about two-thirds of the local oscillator frequency.

These undesired heterodyne components produce noticeable distortion in the resultant picture display. The 46.5 megacycle beat frequency component particularly affects the black and white video signals while the 42 megacycle beat frequency component distorts the color video signals. It has been experimentally determined, that for acceptable reception of channel six signals, these undesired heterodyne components should be reduced to at least 40 db less than that of the desired channel six signal components.

The mixer circuit of the invention reduces the effect of the undesired heterodyne components by optimizing the performance of the mixer stage to reject the radio frequency combinations and harmonics (175.5 and 171 megacycle) that are the major contributors of the beat frequency components. Referring now to the drawings, FIGURE 1 is an illustration of a mixer circuit embodying the invention. A non-linear amplifying device, which in the present embodiment is a transistor 10, is connected in a common emitter configuration. The collector electrode of transistor 10 is connected through a primary winding 12 of a tunable I.F. transformer 14, a feed-through capacitor 16 and a series dropping resistor 18 to an operating potential supply point 20. The supply point 20 is adapted to be connected to a source of energizing potential such as a positive terminal of a direct current (D-C) power source. A capacitor 22 is connected between the collector electrode of the transistor 10 and ground to bypass radio frequency signals and tunes the transformer 14 to intermediate frequencies.

The emitter electrode of the transistor 10 is connected to an intermediate point or tap on a tunable inductor 24. One end of the inductor 24 is connected to ground through a feed-through capacitor 26 and a series biasing resistor 28. A capacitor 30 is connected between the other end of the inductor 24 and ground. The inductor 24 and the capacitor 30 combine to provide a resonant frequency trap 25 designed to trap frequencies between the range of 171–175.5 megacycles.

The connection of the emitter of transistor 10 to the inductor 24 can be varied to change the effective Q of the resonant circuit trap 25. By connecting the emitter closer to the junction of the inductor 24 and the capacitor 30 the Q of the circuit may be decreased as a result of the increased loading of the trap by the transistor 10. The Q of the circuit is adjusted to a compromise value to broaden the bandwidth of the trap circuit to effectively minimize both of the major undesired heterodyne component contributors, 171–175.5 megacycles.

The junction of the capacitor 30 and the inductor 24 is connected through a diode 32, a feed-through capacitor 34, a series limiting resistor 36 and a switch 38 to a supply point 40. The supply point 40 is adapted to be connected to a positive terminal of a D-C power supply. When the switch 38 is closed the diode 32 conducts and presents a low impedance to ground to short-out the trap.

Signals developed by a local oscillator 42 are coupled through a capacitor 44 to the base electrode of the transistor 10. Received radio frequency signals are applied across the terminals 46 and fed through a coupling capacitor 48 to the base electrode of the transistor 10. The transistor 10 is biased into conduction by a voltage divider including the series resistors 50 and 52 connected between the supply point 20 and ground. A variable neutralization capacitor 55, is connected between the junction of the feed-through capacitor 16 and the resistor 18 and the base electrode of the transistor 10.

In operation, the radio frequency signals applied across terminals 46, beat with the local oscillator frequency coupled through the capacitor 44, to produce an intermediate frequency (difference frequency) which is developed across the primary winding 12 of the intermediate frequency transformer 14 and coupled through to the secondary winding 13 to the output terminals 54. For the range of channel six frequencies (82–88 mc.) the effect of the resonant trap including inductor 24 and capacitor 30 (tuned to 171–175.5 mc.) is negligible. The resonant trap effectively presents a very low impedance to the intermediate frequencies wherein the gain of the the mixer circuit is high. On the other hand, the impedance presented by the resonant trap for the range of frequencies between 171–175.5 megacycles (the major contributors of beat frequency components) is very high wherein the gain of the mixer stage is substantially reduced fo rthis range of frequencies. As a result, the mixer circuit effectively rejects signals ranging from 171–175.5 megacycles thereby minimizing the 46.5 megacycle and 42 megacycle undesired intermediate heterodyne components. The trap circuit 25 is also effective to reduce channel seven (174–180 megacycles) image response on channel six if a strong channel seven signal is present.

The bandwidth of the trap 25 (171–175.5 mc.) falls within the range of frequencies allotted to channel seven (174–180 mc.) As a result, the trap 25 must be inactivated when tuned to receive channel seven. As indicated by the dashed line, the local oscillator 42 and the switch 38 are ganged for unicontrol operation. The operation is such that the switch 38 is closed when tuned to channel seven or alternatively at all channel positions except the channel six position.

FIGURE 2 is a schematic circuit diagram of another mixer circuit embodying the invention. Like components in FIGURES 1 and 2 will be designated by the same reference numerals. A resonant circuit trap 57 including the parallel variable inductor 56 and the capacitor 58 is connected in a series circuit between the collector of the transistor 10 and the primary winding 12 of the I.F. transformer 14. The emitter electrode of transistor 10 is connected directly through the feed-through capacitor 26 and the series biasing resistor 28 to ground. A switch 60 (ganged to the local oscillator 42 for unicontrol operation) is connected across the parallel resonant trap to inactivate the effect of the resonant tuned trap 57 at selected channels.

The trap circuit 57 has a response characteristic which provides high series impedance to signals between 171–175.5 megacycles. When the television receiver is tuned to channel six, the resonant tuning trap 57 effectively produces a high impedance in series with the collector of transistor 10 and produces an out-of-phase feedback type of cancellation to reduce the gain of the mixer circuit for frequencies between 171–175.5 mc. As a result, the receiver circuit of FIGURE 2 effectively rejects the signal components (harmonics, etc.) that produce 46.5 mc. and 42 mc. beat components. The switch 60 may be closed at any other channel to eliminate the effect of the resonant frequency trap 57.

The circuits of FIGURES 1 and 2 can further be modified by including two resonant circuit traps, one tuned to 171 megacycles and other to 175.5 megacycles. This will optimize the beat frequency rejection at the two frequencies at the cost of an added inductor, a capacitor and a switch. One resonant circuit can be included in the collector electrode circuit (as shown in FIGURE 2) and the other in the emitter circuit (as shown in FIGURE 1) or two in parallel in the emitter circuit or two in parallel in the collector circuit.

What is claimed is:

1. A frequency converter circuit for heterodyning received television signals including both picture and sound carriers with a locally generated oscillation wave to produce corresponding intermediate frequency television signals including both picture and sound carriers comprising in combination:

a nonlinear amplifier device having first and second electrodes defining a current path and a third electrode for controlling the current through said path;

input circuit means for applying a locally generated oscillation wave and a received television signal including both picture and sound carriers coupled between said third electrode and one of said first and second electrodes;

frequency responsive output circuit means having a bandpass frequency response for selecting heterodyne component corresponding to the difference in frequency between said oscillator wave and said received television signal;

frequency responsive trap means exhibiting a high impedance at a frequency of the order of twice the frequency of a television signal whose frequency is substantially two-thirds the oscillator frequency, and means coupling said frequency responsive output circuit means and said frequency responsive trap means in series with said current path.

2. A frequency converter circuit as defined in claim 1 wherein said frequency responsive trap means exhibits high impedances to signals of frequencies corresponding to twice the sound carrier frequency.

3. A frequency converter circuit as defined in claim 1 wherein said frequency responsive trap means exhibits high impedances to signals of frequencies corresponding to the sum of the sound and picture carrier frequencies.

4. A frequency converter circuit as defined in claim 1 wherein said frequency responsive trap means exhibits a high impedance to signals in a frequency range between 171 and 175.5 megacycles.

5. A frequency converter circuit for heterodyning any one of a plurality of received television channel signals including channels 2–13 with a locally generated oscillation wage to produce a corresponding intermediate frequency television signal including both picture and sound carriers comprising in combination:

a transistor having base, emitter and collector electrodes;

input circuit means for applying a locally generated oscillator wave and a preselected one of said received television channel signals coupled between said base and emitter electrodes.

frequency responsive output circuit means for selected heterodyne components corresponding to the difference between said oscillation wave and said received television channel signal in a frequency range substantially between 40 and 47 megacycles;

frequency responsive trap means exhibiting a high impedance to signals in a frequency range of substantially 170 and 176 megacycles; and means coupling said frequency responsive output circuit means and said frequency responsive trap means in series with said collector and emitter alectrodes.

6. A frequency converter as defined in claim 5 including means for bypassing said frequency responsive trap means when the received signal corresponds to a television channel other than channel six.

7. A frequency converter as defined in claim 5 including means for bypassing said frequency responsive trap means except when the received signal corresponds to channel six.

8. A frequency converter as defined in claim 7 wherein said means for bypassing said frequency responsive trap means comprises a diode which is forward biased except when the received signal corresponds to channel six.

9. A frequency converter as defined in claim 7 wherein said means for bypassing said frequency responsive trap means comprises a switching element ganged for unicontrol operation with the tuning of said local oscillation wave generating means.

10. A frequency converter circuit comprising:

an amplyfying device having an output electrode, a common electrode and a control electrode, said amplifying device including a current path between said output and common electrode;

input circuit means connected to said control electrode for applying input signals having a predetermined frequency range;

means for applying oscillator signals of a predetermined frequency to said amplifying device whereby said amplifying device combines said oscillator and input signal to produce an output signal having a frequency component that is the difference between said input signal frequency range and said oscillator signal frequency;

output circuit means connected in series with said current path for developing said output signals, said output circuit means being adapted to be connected to a source of energizing potential for energizing said amplifying device; and a resonant circuit connected in series with said current path and said output circuit means providing a tuned circuit trap, the resonant frequency of said resonant circuit being substantially greater than the frequency components of said output signal whereby said resonant circuit reduces the gain of said converter circuit at its resonant frequency.

11. A mixer circuit for a very high frequency television tuner comprising:

a semiconductor device including a first and second electrode and a control electrode;

a supply point and a reference point adapted to be connected to a source of energizing potential;

input circuit means connected between said control electrode and said reference point for applying received television signals to said control electrode;

circuit means for applying local oscillator signals to said control electrode whereby said semiconductor device beats said oscillator and input signals to produce intermediate frequency signals, said intermediate frequency signals being the difference between said input signals and said oscillator signal;

a first resonant circuit, tuned to said intermediate frequency signals, coupled between said first electrode and said supply point providing an output circuit for said mixer circuit;

an inductor;

a capacitor;

circuit means coupling said capacitor to said inductor to provide a second resonant circuit, said second resonant circuit exhibiting an effective resonant frequency range including at least the range of frequencies between 171 to 175.5 megacycles;

circuit means coupling said second resonant frequency circuit between said second electrode and said reference point whereby said second resonant frequency circuit provides a high impedance to the frequency within said resonant frequency range reducing the gain of the mixer circuit at said resonant frequency range, thereby effectively rejecting any frequency components within said resonant frequency range; and means for inactivating said second resonant circuit when tuned to at least one very high frequency television channel.

12. A transistor converter circuit for a VHF television tuner comprising:

a transistor having base, emitter and collector electrodes;

a supply point and a reference point, said supply point and reference points being adapted to be connected to opposite terminals of a source of energizing potential;

input circuit means coupled between said base electrode and said reference point for applying received radio frequency signals and local oscillator signals to be mixed by said transistor, said input circuit means including biasing means for biasing said transistor;

resonant output circuit means coupled between said collector electrode and said supply point for developing an intermediate frequency;

a resonant circuit including an inductor having two end terminals and an intermediate terminal and a capacitor connected to one of said end terminals, said resonant circuit having a resonant frequency in the order of 172 megacycles;

circuit means coupling said other inductor end terminal to said reference point;

circuit means coupling said emitter electrode to said inductor intermediate terminal;

a diode;

circuit means connecting said diode to the junction of said capacitor and inductor; and switching means for applying a control voltage to said diode to render said diode conductive to bypass the effect of said resonant circuit at selected television channels.

13. A converter circuit comprising;

a transistor having base, emitter and collector electrodes, said transistor including a current path between said emitter and collector electrodes;

input circuit means connected between said base and emitter electrodes for applying received signals having a predetermined carrier frequency and oscillator signals of a frequency in the order of one and a half times said carrier frequency;

a resonant circuit having a predetermined resonant frequency bandwidth connected to one of said emitter and collector electrodes providing a tuned circuit trap, said resonant frequency bandwidth including frequencies in the order of twice the received signal carrier frequency whereby said resonant circuit decreases the gain of said converter circuit for the frequencies within said resonant frequency bandwidth output circuit means for developing the difference frequency between said input signals and said oscillator signals coupled in a series circuit with said resonant circuit and said current path between said emitter and collector electrodes, said output circuit means being adapted to be connected to a source of energizing potential for energizing said transistor; and switching means coupled to said resonant circuit to selectively render said resonant circuit inoperative.

References Cited

UNITED STATES PATENTS 3,323,062 5/1967 Ganzel et al. ---- 325—436 XR

KATHLEEN H. CLAFFY, *Primary Examiner.*

R. S. BELL, *Assistant Examiner.*

U.S. Cl. X.R.

325—479